(12) United States Patent
Knapton, III

(10) Patent No.: US 6,611,954 B1
(45) Date of Patent: Aug. 26, 2003

(54) BINARY COMPATIBLE SOFTWARE OBJECTS

(75) Inventor: Kenneth S. Knapton, III, Orem, UT (US)

(73) Assignee: Intel Corporation, Santa Clara, CA (US)

(*) Notice: Subject to any disclaimer, the term of this patent is extended or adjusted under 35 U.S.C. 154(b) by 466 days.

(21) Appl. No.: 09/089,834

(22) Filed: Jun. 3, 1998

(51) Int. Cl.[7] .................................................. G06F 9/44
(52) U.S. Cl. ....................... 717/116; 717/100; 717/106; 717/114; 717/108
(58) Field of Search ................................ 395/701, 712

(56) References Cited

U.S. PATENT DOCUMENTS

| | | | | |
|---|---|---|---|---|
| 5,544,302 A | * | 8/1996 | Nguyen ........................ 395/326 |
| 5,634,129 A | * | 5/1997 | Dickinson .................... 709/303 |
| 5,682,468 A | * | 10/1997 | Fortenbery et al. ......... 345/419 |
| 5,692,184 A | * | 11/1997 | Ardoin et al. ............... 707/103 |
| 5,701,484 A | * | 12/1997 | Artsy .......................... 395/683 |
| 5,778,227 A | * | 7/1998 | Jordan ......................... 395/682 |
| 5,835,914 A | * | 11/1998 | Brim ........................... 707/206 |
| 5,842,220 A | * | 11/1998 | Groot et al. ................. 707/103 |
| 5,881,230 A | * | 3/1999 | Christensen et al. ........ 709/203 |
| 5,903,754 A | * | 5/1999 | Pearson ....................... 709/300 |
| 5,905,987 A | * | 5/1999 | Shutt et al. .................. 707/103 |

OTHER PUBLICATIONS

Denning, Adam, "ActiveX Controls Inside Out", Microsoft Press (1997), p. 131.

* cited by examiner

*Primary Examiner*—Chameli C. Das
(74) *Attorney, Agent, or Firm*—Trop, Pruner & Hu, P.C.

(57) ABSTRACT

An object oriented programming technology enables multiple objects to be snapped into a given container or client. Thus, for example, multiple ActiveX controls can be snapped into one given container and these controls may be accessed in a fashion which can be truly termed binary compatible. That is, each of the controls can be accessed without requiring recompiling even when they have different identifiers and/or different interfaces. In one embodiment, this may be accomplished by providing SetGUID and Get-GUID functions in a layer class associated with the objects. The identifier of the desired object can be obtained from the system database and set in the layer class to selectively access one of at least two objects in the same container without recompiling.

1 Claim, 3 Drawing Sheets

BINARY COMPATIBLE SOFTWARE OBJECTS

BACKGROUND

This invention relates generally to object oriented software technologies and particularly to software objects which are binary compatible.

ActiveX controls are a subset of the COM object oriented software technology. COM can use a variety of different object oriented program languages such as C++, java and Visual Basic. ActiveX controls are typically plugged into a control container which is a type of client.

The ActiveX controls self-register on a computer in a database. In Windows®-based platforms, the database is called a registry. The registry provides a way for a control to advise the client about the control's functionality. More specifically, the ActiveX control places keys in the registry or database to let the container know its functionality. The registry includes information which identifies a particular control or object including Globally Unique Identifiers (GUIDs), Category Identifiers (CATIDs), and Class Identifiers (CLSIDs).

A layer class, wrapper or interface, definition is a source code level version of a COM object. It provides an interface between the container or client and the object which may be an ActiveX control. Additional controls may be inserted, snapped in or "plugged in" to a container that already has one or more controls. A plug-in control is source compatible if a new version of the control works unchanged in a container application but the user program must be rebuilt. That is, the application program must be recompiled and then the application can be run without further change.

With a "binary compatible" control, a new version can be plugged into an existing application that was designed and built for the old version. However, the conventional wisdom in the field is that the plug-in must appear to the container as if it were the old version in order for the plug-in to be binary compatible. That is, the plug-in must support the old CLSID and all interfaces exactly as they were (that is, with the same IIDs, names, dispids, parameters and so forth). See Denning, Adam, "ActiveX Controls Inside Out", Microsoft Press (1997), p. 131. Thus, the conventional wisdom holds that in order to be binary compatible, the same identifiers and interfaces must be used for the plug-in.

A GUID is conventionally hard coded into a layer class. Other objects can then be used with a given container; however, they must have the same interface and GUID in order to work with the layer class in a binary compatible fashion.

Thus, there is a continuing need to enable objects, with different interfaces and/or different GUIDs, to snap in to a container or client environment.

SUMMARY

In accordance with one aspect of the present invention, a method for object oriented programming includes creating a first object, having a first identifier associated with a first client. Thereafter, a second object having a second identifier is inserted, such that the second object is associated with the first client. Even though the first and second identifiers are different, the second object is used with the first client, without recompiling.

DETAILED DESCRIPTION

Figure 1:
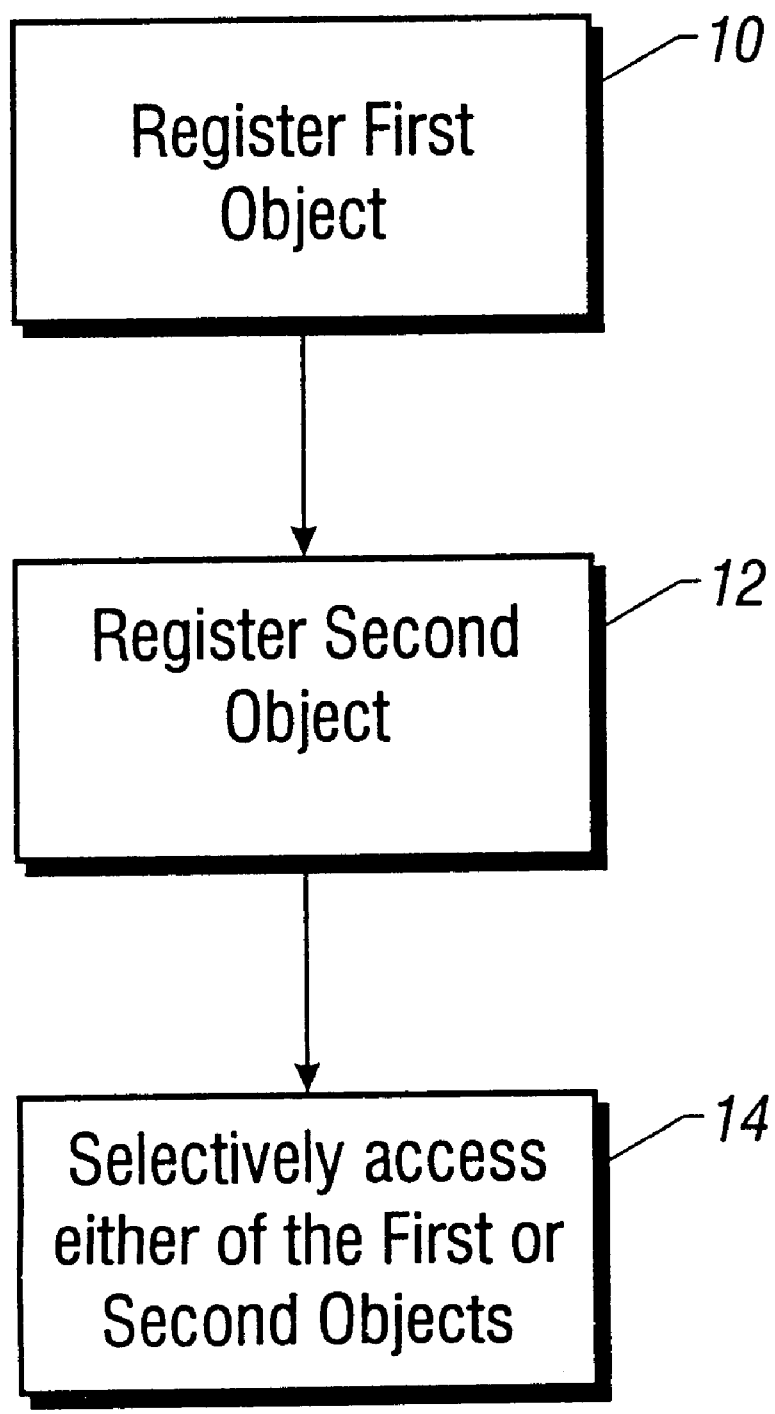
FIG. 1 is a high level flow diagram in accordance with one aspect of the present invention.

Referring to FIG. 1, a method for object oriented programming may be implemented in any object oriented programming technology including COM, ActiveX, Java, Visual Basic, C++ and the like. As indicated in block 10, a first object with a first GUID is registered on the system. Then a second object with a second GUID may be registered as indicated in block 12. Time may pass between the first and second registrations. The registration may be done in any conventional database for registering objects including the so-called registry utilized in Windows®-based platforms.

As indicated in block 14, it is thereafter possible to selectively access one of the first and second objects using the same client or container despite the fact that the objects have different GUIDs. In addition, these first and second objects may be accessed using the same container or client despite the fact that they have different interfaces, for example, in connection with COM based objects. Of course, the dispids and parameters for the two objects still would be the same. However, the first object or the second object may be selectively accessed after snapping in the second object.

In this way, a truly binary compatible object system may be developed in which a second object may be snapped into a container or client containing a first object and the second object may be utilized without recompiling. No recompiling is necessary even though the first and second objects have different GUIDs and even if the first and second objects have different interfaces, for example, in the case of COM applications.

While these techniques are applicable to a variety of technologies, they are particularly applicable to ActiveX controls wherein first and second controls may be snapped into a container. In this way the container can selectively access either the first or the second object without recompiling. In applications using a layer class or wrapper, the layer class may then be associated with more than one object. A new ActiveX control can be snapped in without creating a new layer class each time, which would require recompiling.

Figure 2:
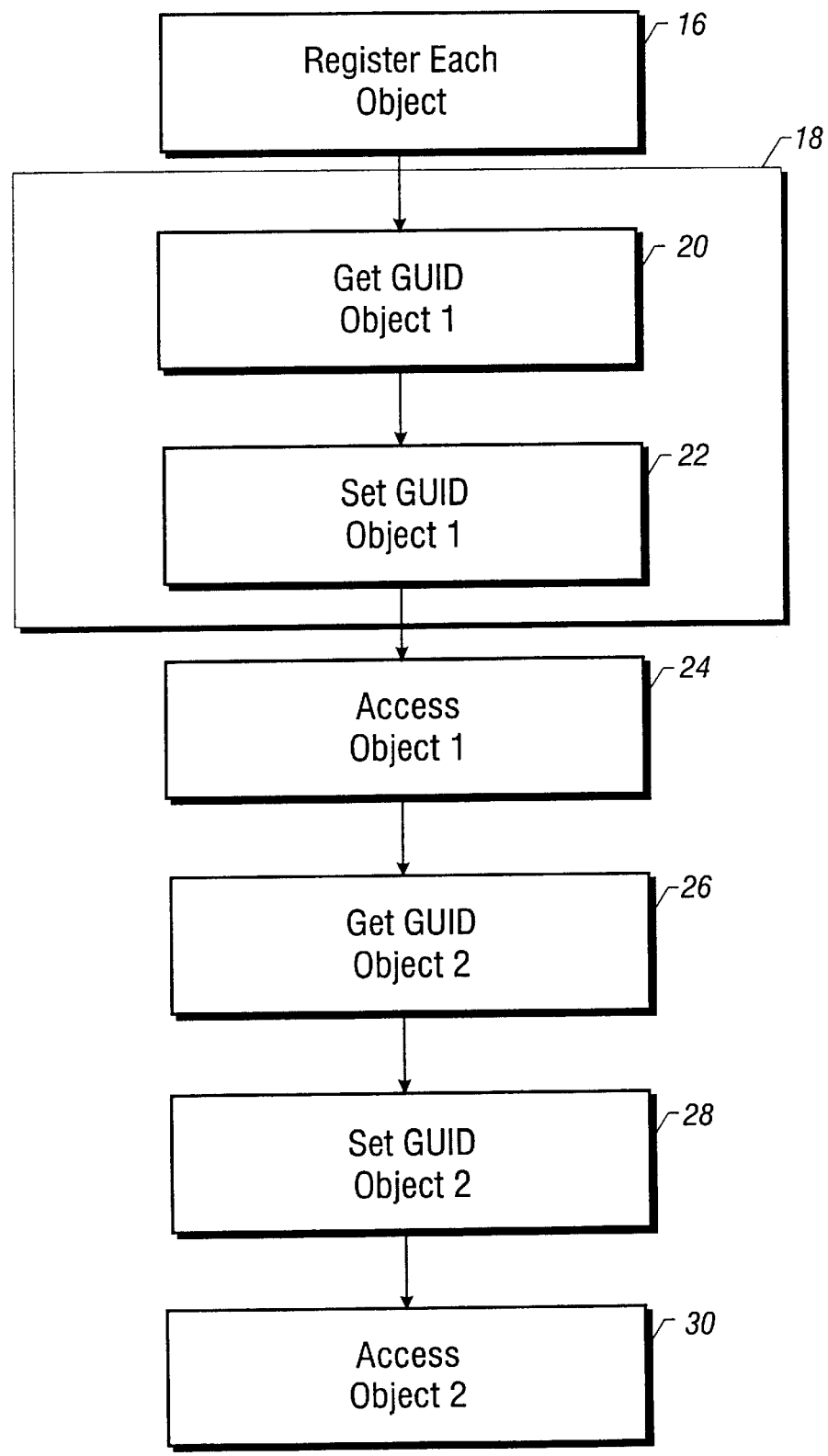
FIG. 2 is a more detailed flow chart for implementing a flow in accordance with FIG. 1.

Referring now to FIG. 2, a more detailed flow chart for implementing the technology of FIG. 1 in COM technology begins with block 16. At block 16, each object for a given client or container is registered. At block 18, a layer class is appropriately programmed (using the SetGUID and GetGUID methods described below) to enable the GUIDs for any of the registered objects to be selected. Thereafter, it is then possible to access either object despite the fact that the second object that is snapped in may have a different GUID than the first object. In connection with applications involving ActiveX controls using dynamic linked libraries or DLLs, the registration is normally accomplished using the DllRegisterServer( ) method in Windows®-based applications. In non-ActiveX applications when DLLs are not used, the registration may be done with EXEs. In this way, the GUIDs of the respective objects are registered in a database (or in Windows® applications, at the registry).

SetGUID and GetGUID methods are implemented in an application involving a layer class. GetGUID, which is part of the layer class, provides the GUID that is set when the layer class calls for its own GUID. The SetGUID method, which is part of the layer class, sets the GUID in the layer class for the desired object, as shown at block 22. Thus, SetGUID sets the new GUID in the layer class and GetGUID returns the GUID from the database.

In alternative embodiments it is possible to use the CoCreateInstance method to send in the GUID of the second object when that object is referenced. The GUID of the second object is sent in for the snapped in second object and the same interface definition may be utilized for both objects. In this case, the SetGUID and the GetGUID method are unnecessary and manipulation of the layer class is likewise unnecessary.

Using either technique, it is possible to dynamically create new functions in the future for a given client or container. This can be done in a truly binary compatible fashion without requiring identifiers to be identical or interfaces to be identical, or recompiling.

Referring again to FIG. 2, one can access the first object, as indicated in block 24, thereafter obtain the GUID for a second object, as indicated in block 26, and set the GUID for the second object in place of the GUID for the first object, as indicated in block 28. As indicated in block 30, the second object may be accessed by the same container or client that previously would have accessed the first object. This is done in a binary compatible fashion without recompiling.

These techniques are applicable, not only to in process servers such as DLLs, but also to remote applications, such as Distributed COMs (DCOMs). Generally the techniques described herein are applicable to any object which can be snapped into a container or client situation.

Figure 3:
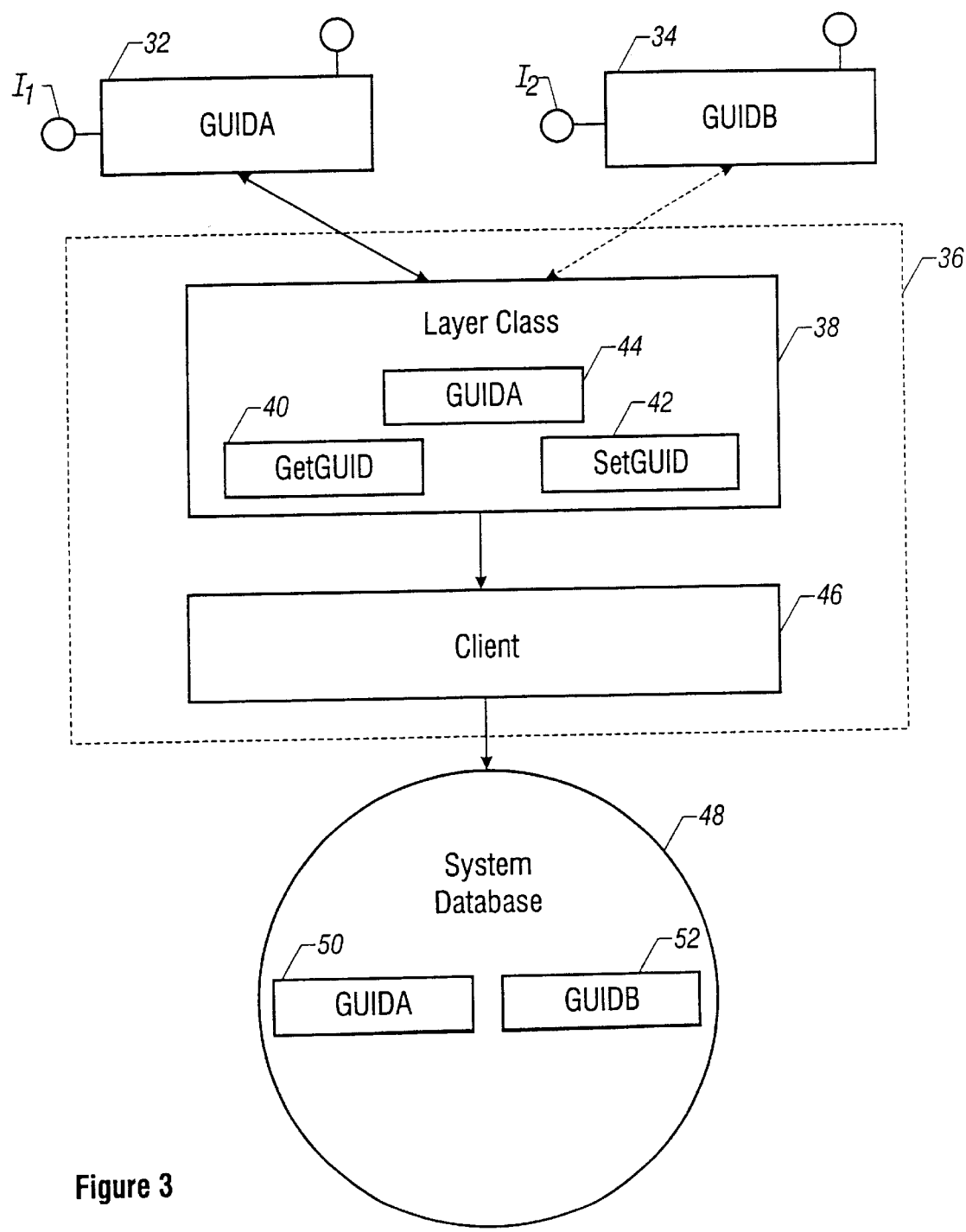
FIG. 3 is a conceptual depiction of an approach to object oriented programming.

Referring now to FIG. 3, a pair of objects 32 and 34 have different GUIDs and different interfaces. The interface for the object 32 is indicated as I1 and the GUID for object 32 is indicated as GUIDA. Similarly, the GUID for object 34 is GUIDB and the interface for object 34 is I2.

The compiled application, indicated within the dotted line box 36, includes, in the illustrated embodiment, a layer class or wrapper 38 and the client or container 46. As indicated, the layer class communicates with the client 46.

The layer class 38 includes the SetGUID method 42 and the GetGUID method 40. The layer class 38 also stores the selected GUID 44. In the illustrated embodiment, the selected GUID is the GUIDA as indicated by the arrow between the layer class and the object 32. However, the layer class can obtain the GUID for the object 34 through the client from the system database 48. The system database or registry includes GUIDs 50 and 52 in the illustrated embodiment. Thus, the client can obtain GUIDs for desired objects from the system database 48 and the layer class can access the corresponding object without requiring recompiling.

In prior systems, the objects 32 and 34 would need to have the same GUIDs and interfaces to enable a binarily compatible snap-in system. Now snap-in objects with different GUIDs and different interfaces may be used to implement new functions as necessary in the future without recompiling. In this way, a layer class may be created that has selectively programmable GUIDs for more than one object.

With embodiments of the present invention, one can extend a current technology by allowing updates and new functions. That is, a new object may be used in place of its predecessor. The new object may also be used selectively in conjunction with its predecessor.

While the present invention has been described with respect to a limited number of preferred embodiments, those skilled in the art will appreciate numerous modifications and variations therefrom. For example, while the illustrated embodiments illustrate a COM or ActiveX controls application, those skilled in the art will appreciate that similar approaches can be used in other programming technologies and languages. It is intended that the appended claims cover all such modifications and variations as fall within the true spirit and scope of the present invention.

What is claimed is:

1. A container for a software object comprising:

one or more objects, said container adapted to selectively work with first and second objects having different identifiers; and a layer class adapted to selectively utilize the identifier of either said first or second object, said layer class including a first function that obtains globally unique identifiers from the system database and a second function that sets globally unique identifiers in the layer class.

* * * * *